United States Patent
Mezghani et al.

(10) Patent No.: US 11,418,414 B2
(45) Date of Patent: Aug. 16, 2022

(54) METHOD FOR COORDINATING A PLURALITY OF DEVICE MANAGEMENT SERVERS

(71) Applicant: ORANGE, Issy-les-Moulineaux (FR)

(72) Inventors: Emna Mezghani, Chatillon (FR); Marc Douet, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 17/261,380

(22) PCT Filed: Jul. 2, 2019

(86) PCT No.: PCT/FR2019/051630
§ 371 (c)(1),
(2) Date: Jan. 19, 2021

(87) PCT Pub. No.: WO2020/016499
PCT Pub. Date: Jan. 23, 2020

(65) Prior Publication Data
US 2021/0281495 A1  Sep. 9, 2021

(30) Foreign Application Priority Data
Jul. 20, 2018  (FR) ...................... 1856776

(51) Int. Cl.
*H04L 41/5041*  (2022.01)
*H04W 4/70*  (2018.01)
(Continued)

(52) U.S. Cl.
CPC ............ *H04L 41/5041* (2013.01); *G06F 8/61* (2013.01); *G06F 9/52* (2013.01); *G06F 16/285* (2019.01);
(Continued)

(58) Field of Classification Search
CPC ............ H04L 41/5041; H04L 41/0893; H04L 41/5019; H04L 41/5006; H04L 41/042;
(Continued)

(56) References Cited

U.S. PATENT DOCUMENTS

| | | | |
|---|---|---|---|
| 5,841,981 A | 11/1998 | Kondo | |
| 2002/0055849 A1* | 5/2002 | Georgakopoulos | G06Q 10/06 717/102 |

(Continued)

FOREIGN PATENT DOCUMENTS

| | | | |
|---|---|---|---|
| GB | 2530552 A | 3/2016 | |
| JP | 2004-288067 A * | 10/2004 | ............ G06F 17/21 |
| WO | 0190903 A1 | 11/2001 | |

OTHER PUBLICATIONS

Matsumura, English Translation "Coordination processing device, method and program", Oct. 14, 2004, ip.com, 18 pages. (Year: 2004).*

(Continued)

*Primary Examiner* — Gil H. Lee
*Assistant Examiner* — Chhian (Amy) Ling
(74) *Attorney, Agent, or Firm* — David D. Brush; Westman, Champlin & Koehler, P.A.

(57) ABSTRACT

A method for coordinating a plurality of device management servers, the plurality of device management servers including at least a first management server and a second management server. The method includes: receiving a first instruction for a first device connected to the first management server; receiving a second instruction for a second device connected to the second management server; obtaining information concerning dependency between the first and second devices; based on the dependency information and rules for coordinating the execution, determining an order of execution of the first instruction and second instruction; generating and sending a first control signal for execut-
(Continued)

ing the first instruction and a second control signal for executing the second instruction according to the determined order.

10 Claims, 5 Drawing Sheets

(51) Int. Cl.
```
G06F 8/61      (2018.01)
G06N 5/02      (2006.01)
H04L 41/042    (2022.01)
H04L 41/0893   (2022.01)
H04L 41/5006   (2022.01)
H04L 41/5019   (2022.01)
H04L 67/125    (2022.01)
G06F 16/28     (2019.01)
G06F 9/52      (2006.01)
```
(52) U.S. Cl.
CPC .............. *G06N 5/022* (2013.01); *G06N 5/025* (2013.01); *H04L 41/042* (2013.01); *H04L 41/0893* (2013.01); *H04L 41/5006* (2013.01); *H04L 41/5019* (2013.01); *H04L 67/125* (2013.01); *H04W 4/70* (2018.02)

(58) Field of Classification Search
CPC ....... H04L 67/125; H04W 4/70; G06N 5/022; G06N 5/025; G06F 8/61; G06F 9/52; G06F 16/285
See application file for complete search history.

(56) References Cited

U.S. PATENT DOCUMENTS

| | | | | |
|---|---|---|---|---|
| 2007/0250632 | A1* | 10/2007 | Nomura | H04L 67/125 709/227 |
| 2011/0246978 | A1* | 10/2011 | Alfano | G06F 8/61 717/171 |
| 2013/0024556 | A1 | 1/2013 | Zhu | |
| 2014/0330833 | A1* | 11/2014 | Miyazaki | G06F 16/285 707/740 |
| 2014/0373091 | A1* | 12/2014 | Kirner | H04L 63/1416 726/1 |
| 2017/0201411 | A1* | 7/2017 | Mladin | H04L 41/0213 |
| 2020/0322315 | A1* | 10/2020 | Bone | G06F 13/28 |

OTHER PUBLICATIONS

English translation of the Written Opinion of the International Searching Authority dated Sep. 11, 2019 for corresponding International Application No. PCT/FR2019/051630, filed Jul. 2, 2019.
International Search Report dated Sep. 11, 2019 for corresponding International Application No. PCT/FR2019/051630, filed Jul. 2, 2019.
Written Opinion of the International Searching Authority dated Sep. 11, 2019 for corresponding International Application No. PCT/FR2019/051630, filed Jul. 2, 2019.

* cited by examiner

METHOD FOR COORDINATING A PLURALITY OF DEVICE MANAGEMENT SERVERS

CROSS-REFERENCE TO RELATED APPLICATIONS

This Application is a Section 371 National Stage Application of International Application No. PCT/FR2019/051630, filed Jul. 2, 2019, the content of which is incorporated herein by reference in its entirety, and published as WO 2020/016499 on Jan. 23, 2020, not in English.

FIELD OF THE DISCLOSURE

The present invention relates to the field of devices communicating in M2M ("Machine To Machine"), and in particular to the coordination of device management servers in order to coordinate the operations of different devices in a network.

BACKGROUND OF THE DISCLOSURE

In 2017, the number of connected objects in circulation worldwide was estimated at around 20 billion. According to predictions, that number will be over 75 billion by 2025. This growing number of connected objects, as well as the possibility for these objects to exchange data with each other via the Internet of Things (IoT), make it necessary to develop servers for device management.

The purpose of a device management server is to manage the management operations of device assets, mobile or not, connected to a network. For example, these devices may include computers, tablets, mobile phones, printers, etc. These devices may also include devices from highly diverse fields of application, such as home automation (for example a presence or movement detector, or a networked thermostat), transport (for example a bicycle, a scooter, or a car that are equipped with sensors), logistics (for example objects with radio frequency identification devices, such as an RFID chip), and health (for example surgical tools equipped with sensors, or measurement/monitoring devices configured to transmit information about a patient's biological variables to a server), etc.

In particular, a device management server manages the execution of operations on the devices, and ensures the security and longevity of the network, in particular by propagating security patches and by updating the devices.

Due to the diversity of the devices, it is generally necessary to have a plurality of management servers which must communicate with each other to ensure joint management of the groups of devices with which they are associated.

However, the existing solutions do not allow managing certain configurations, which can adversely affect the smooth running of management operations or the security of the devices.

For example, certain operations such as restarting or updating the firmware of a device can cause a temporary loss of connectivity of this device. The devices connected to it thus also temporarily lose connectivity. In the event of an urgent security update operation on these devices, the device management servers that manage these devices cannot reach them. The update therefore cannot be done, which compromises the security of the devices.

Other operations such as configurations or updates of the application programming interfaces (API) of the devices can cause a malfunction between the devices. For example, if one of the devices has not updated an API, this can make it impossible to communicate with the devices that have updated their API.

There is therefore a need to improve the management of devices in a multiserver environment.

SUMMARY

The invention improves the situation.

To this end, the invention proposes a method, implemented by a coordination computer server, for coordinating a plurality of device management servers in a computer network, said plurality of device management servers comprising at least at least a first management server and a second management server, the method comprising:
  receiving a first instruction intended for a first device connected to said first management server;
  receiving a second instruction intended for a second device connected to said second management server;
  obtaining dependency information concerning a dependency between the first device and the second device;
  obtaining rules for coordinating the execution of the first instruction and the second instruction;
  determining an order of execution of the first instruction and second instruction, based on the dependency information and the coordination rules obtained;
  generating and sending a first control signal for executing the first instruction and a second control signal for executing the second instruction according to the determined order.

Advantageously, the coordination method takes into account the dependencies which exist between the various devices of the network to orchestrate the execution of the operations on these devices. This prevents, for example, a device on which an operation is in progress (such as an update) from being disconnected from the network because another operation (such as a restart) is carried out on the device which provides the connection. This also avoids incompatibility problems between the APIs of two devices when these two devices are linked in the execution of a series of operations (for example, turning on lights via a voice assistant).

The expression "instruction intended for a device" is understood to mean an instruction concerning a management operation to be performed on that device. The term "rules for coordinating the execution of instructions received" is understood to mean rules for coordinating the execution of management operations associated with the instructions received. In the following, for the sake of simplicity, the rules for coordinating the execution of instructions may be referred to as "rules for coordinating the execution of operations".

"Dependency" between two devices is understood to mean that the operation of one of the devices is linked to the operation of the other device, or that the execution of an operation by/on one device has an effect on the other device.

Taking the dependency between the devices into account is particularly advantageous in a multiserver environment, in which devices dependent on one another can be managed by separate and independent servers. Indeed, when dependent devices are managed by independent servers, an operation could be launched on a device without considering the impact this has on the devices which are dependent on it. This can compromise the proper operation of dependent devices, as well as the security of the entire network.

Moreover, the fact that the coordination is managed by an "intermediate" server (which "intercepts" the instructions, stores them, and determines their order of execution before retransmitting them) prevents the management servers from having to communicate with each other and manage the coordination of operations on their side. This allows not changing the structure of the management servers, and limiting the number of interconnections, thus reducing the use of bandwidth.

The coordination server determines an order of execution (meaning a scheduling of operations to be executed) for the instructions, and controls the execution of the instructions according to the determined order. The determined order of execution defines a scheduling criterion for sending the control signals sequentially (for example in the determined order), or for sequentially executing the operations associated with the control signals (for example in the determined order), or for any other technique of sending signals according to a schedule.

For example, said dependency information may comprise:
information about connectivity dependency between the first device and the second device; and/or
information about service dependency between the first device and the second device.

The term "connectivity dependency" between two devices is understood to mean that one of the devices provides connectivity or is connected to the other device via a communication protocol. The term "service dependency" between two devices is understood to mean that the execution of a service on one of the devices involves the other device.

According to one embodiment, the first control signal may be sent to the first management server, and the second control signal may be sent to the second management server.

In this embodiment, the coordination server transmits to the servers a signal to control the execution of the operations, and it is the management servers which send the signal for the execution of the operations to the devices, as is done on conventional device management servers. Furthermore, the management servers may notify the coordination server of the execution of the operations in order to orchestrate the execution of the operations.

According to an alternative embodiment, the first control signal may be sent to the first device, and the second control signal may be sent to the second device.

According to this alternative embodiment, it is the coordination server itself which sends the command to execute the operations to the devices. In other words, it is not necessary to go again through the management servers to control the execution of the operations on the devices. In this configuration, mechanisms for security, certification, and interoperability can be integrated into the coordination server. Approval by the operator may also be required.

In one or more embodiments, the method may further comprise:
for each current management server among the first management server and the second management server, receiving descriptive data corresponding to said current management server, said descriptive data comprising:
a definition of a plurality of devices connected to said current management server,
information about dependencies between devices of said plurality of devices (311, 312) connected to said current management server,
a definition of operations associated with said plurality of devices connected to said current management server, and
a definition of effects associated with said operations on at least one device among said plurality of devices connected to said current management server;
determining said rules for coordinating the execution, from said descriptive data received for the first management server and the second management server.

For example, the coordination server may receive, from each management server, a set of information making it possible to describe the devices which are connected to it, as well as the possible operations for these devices and the effects that these operations can cause in other devices that depend on these devices. From this information, the coordination server can determine the order of execution of the operations on the various devices of the network, from the rules for coordinating the execution of the various instructions.

In addition, the rules for coordinating the execution can be determined from predetermined quality of service criteria.

These quality of service criteria may come from service level agreements signed between a customer and an operator.

The management operations associated with the plurality of devices may in particular comprise: restarting one device among said plurality of devices connected to said current management server, updating one device among said plurality of devices connected to said current management server, configuring one device among said plurality of devices connected to said current management server, or reinitializing one device among said plurality of devices connected to said current management server.

The effects associated with the operations may comprise: a loss of connectivity of one device among said plurality of devices connected to said current management server, or a functional incompatibility between two devices among said plurality of devices connected to said current management server.

In one or more embodiments, the method may further comprise, for each control signal among said first control signal and said second control signal, receiving an acknowledgment of receipt of said control signal.

In one or more embodiments, the method may further comprise, for each control signal among said first control signal and said second control signal, receiving an acknowledgment of execution of the respective instruction associated with said control signal.

This makes it possible to verify that the control signals have indeed been received (in the case of acknowledgments of receipt) by the receiving entities (for example, the management servers or the devices), and/or to verify that an operation has indeed been initialized/executed/taken into account (in the case of acknowledgments of execution). In the event that an acknowledgment of receipt/execution is not received at the coordination server, callback and error management mechanisms may be implemented. Thus, it may be decided, for example, to resend the control signal. Additionally or alternatively, it may also be decided to stop sending other control signals until an acknowledgment of receipt/ execution has been received (for example, all commands corresponding to operations which fall later in the order of execution of the determined instructions than the operation for which the acknowledgement of receipt/execution has not been received).

In one or more embodiments, the order of execution may define an instruction to be executed first among the first instruction and the second instruction. The method may further comprise receiving the acknowledgment of execution of the instruction to be executed first in response to the sending of the associated control signal, and the control signal associated with the instruction to be executed second can be sent only after receipt of said acknowledgment of execution.

This makes it possible to send a control signal to a device only when the previous operation has been executed. Thus, for example if an operation B absolutely requires that an operation A has been carried out beforehand, such an embodiment makes it possible to ensure that operation B is not executed while operation A has not completed.

The invention also relates to a coordination server for coordinating a plurality of device management servers in a computer network, said plurality of device management servers comprising at least a first management server and a second management server, the coordination server able to be configured for:

receiving a first instruction intended for a first device connected to said first management server and a second instruction intended for a second device connected to said second management server;

obtaining dependency information concerning a dependency between the first device and the second device;

obtaining rules for coordinating the execution of the first instruction and the second instruction;

determining an order of execution of the first instruction and the second instruction, based on the dependency information and the coordination rules obtained;

generating and sending a first control signal for executing the first instruction and a second control signal for executing the second instruction according to the determined order.

According to another aspect, the invention relates to a system comprising:

a plurality of device management servers in a computer network, said plurality of device management servers comprising at least a first management server and a second management server;

a plurality of devices connected to said plurality of device management servers, said plurality of devices comprising at least a first device connected to said first management server and a second device connected to said second management server;

at least one memory storing:

a dependency database comprising dependency information concerning a dependency between devices among said plurality of devices; and         a coordination knowledge base comprising a plurality of rules for coordinating instructions on devices among said plurality of devices;

a coordination server configured for:

receiving a first instruction intended for said first device and a second instruction intended for said second device;

obtaining, from the dependency database, information on dependencies between the first device and the second device;

obtaining, from the coordination knowledge base, rules for coordinating the execution of the first instruction and the second instruction;

determining an order of execution of the first instruction and the second instruction based on said retrieved dependency information and said obtained coordination rules;

generating and sending a first control signal for executing the first instruction and a second control signal for executing the second instruction according to the determined order.

The memory may also store instructions received for the various devices connected to the management servers. This makes it possible in particular to determine an order of execution for a set of instructions (for example, instructions received during a predetermined time interval, or a predetermined number of instructions received).

The "memory" may be distributed, so that the dependency databases and the coordination knowledge bases, and/or the instructions, may be stored on different physical media.

Furthermore, the system may further comprise a dependency module configured to detect/manage the dependencies between the various devices of the system. The dependency module may be linked to the dependency database. In one embodiment, the dependency module is comprised in the coordination server.

A computer program implementing all or part of the method described above, installed on one or more pre-existing devices(s), is in itself advantageous since it allows the coordination of a plurality of management servers.

Thus, the present invention also relates to a computer program comprising instructions for implementing some of the steps of the method described above, when this program is executed by a processor.

This program may use any programming language (e.g. object-oriented language or the like), and may be in the form of interpretable source code, partially compiled code, or fully compiled code.

Figure 4:
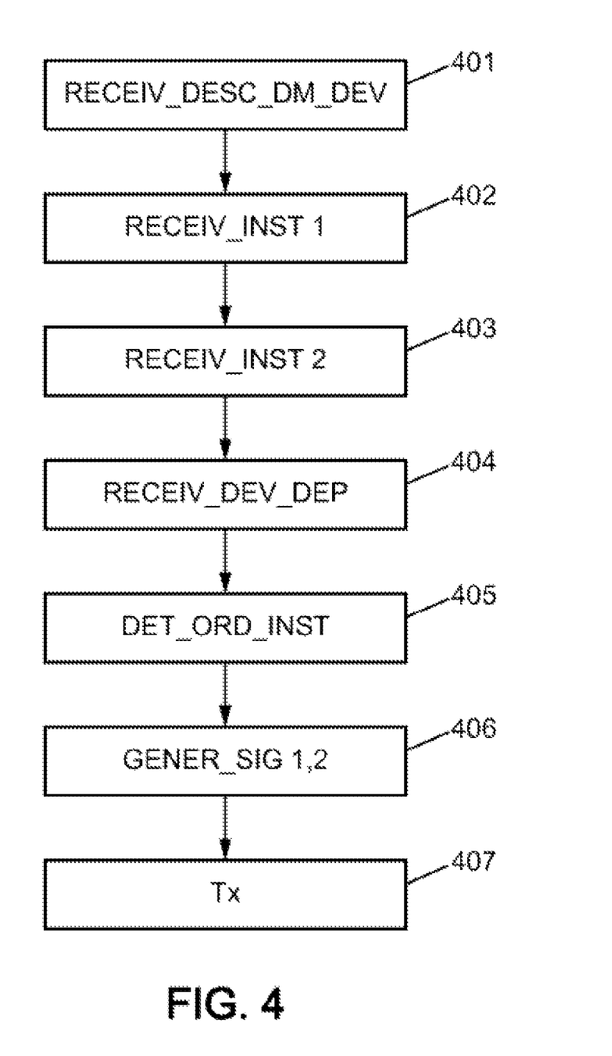
FIG. 4 is a flowchart of the method for coordinating a plurality of device management servers, according to one embodiment of the invention.

FIG. 4, described in detail below, can form the flowchart of the general algorithm of such a computer program according to one embodiment of the invention. Some or all of the steps in this flowchart can be performed in parallel, or sequentially.

Another aspect relates to a non-transitory storage medium for a computer-executable program, comprising a set of data representing one or more programs, said one or more programs comprising instructions for executing, during the execution of said one or more programs by a computer comprising a processing unit operatively coupled to memory means and to an input/output interface module, all or part of the method described above.

BRIEF DESCRIPTION OF THE DRAWINGS

Other features and advantages of the invention will become apparent from reading the description which follows. This is purely illustrative and is to be read in conjunction with the accompanying drawings in which.

DETAILED DESCRIPTION OF ILLUSTRATIVE EMBODIMENTS

Figure 1:
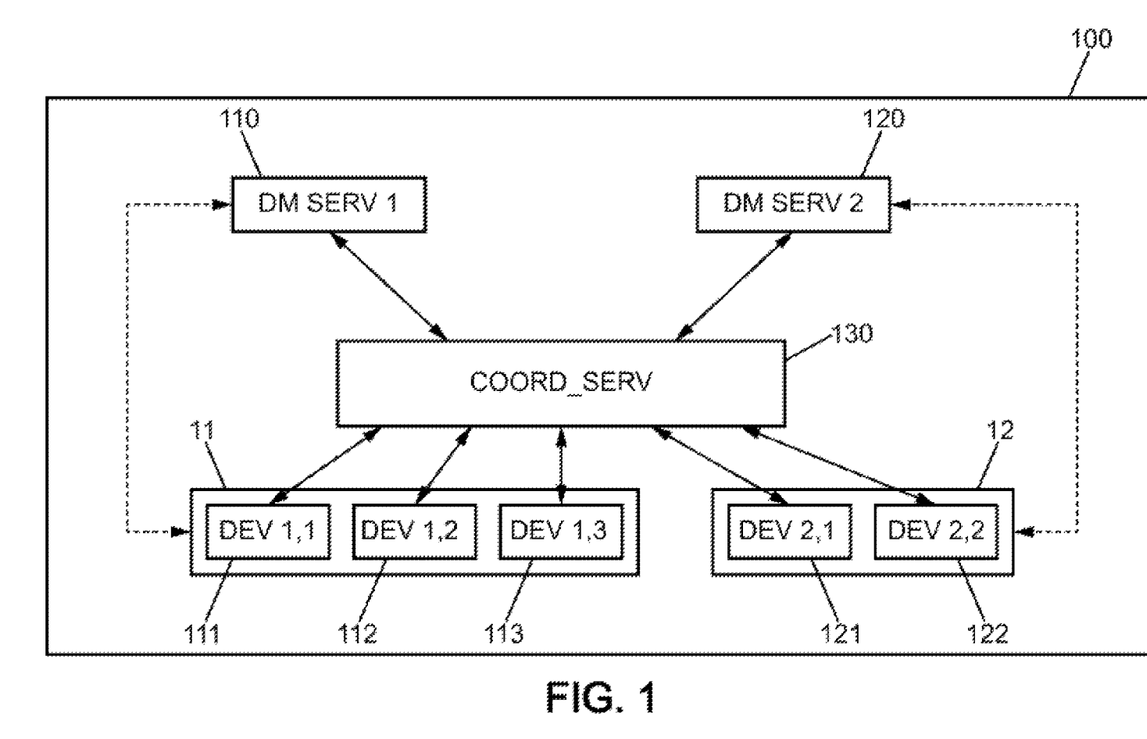
FIG. 1 illustrates a system comprising a plurality of device management servers, according to one embodiment of the invention.

FIG. 1 illustrates a system comprising a plurality of device management servers, according to one embodiment of the invention.

FIG. 1 shows a first management server 110 in charge of managing a first set 11 of devices 111, 112, 113 connected to a network 100, as well as a second management server 120 in charge of managing a second set 12 of devices 121, 122 connected to the same network 100. The two management servers 110 and 120 are independent. The network 100 can be any computer network, for example a local area network (or LAN) or a wide area network (or WAN). In one particular embodiment, a device comprises a management server which can manage other devices that are linked to it.

The coordination server 130 makes it possible to coordinate the execution of operations on the various devices 111, 112, 113, 121, 122. In particular, the coordination server 130 can be configured to calculate and determine an order of execution of the operations, so that there is no malfunction of the system.

Indeed, some operations need to be performed before others. For example, if it is urgent that software on certain devices be updated, the "parent" device which provides these devices with the connection to the network must not be powered off. Thus, if an instruction to restart this parent device has been issued, it can be decided that restarting the parent device will take place after the software of the devices connected to this parent device has been updated.

According to one embodiment, the coordination server 130 is configured to receive an instruction concerning a management operation to be performed on a device or by a device among the devices 111, 112, 113, 121, 122. This instruction may in particular relate to an operating mode of the device (for example, "switch on/switch off/restart the device", "increase/decrease screen brightness", "use battery saver", etc.), an action to perform on certain software (for example, "install/uninstall/update software"), etc.

This instruction may be sent to the coordination server 130 by the management server 110, 120 to which the device is linked, by another management server, or even by an external entity. Of course, it is possible to combine these embodiments, so that certain instructions can be sent to the coordination server 130 by one or more management server(s) 110, 120, while other instructions are sent to the coordination server 130 by one or more external entity(ies).

The sending of instructions to the coordination server 130 concerning operations to be performed on a device or by a device among the devices 111, 112, 113, 121, 122 may be performed via one or more communication technologies. As examples and without limitation, it is possible to use one or more technologies among: wired communication, and wireless technologies such as Wifi, Bluetooth, Bluetooth LE, Infrared, NFC, Zigbee, Enocean, Z-Wave, Sigfox, LTE-M, or LoRaWAN.

The coordination server 130 is further configured to determine an order of execution of the operations to be performed. Once this order of execution has been determined, the coordination server 130 can generate control signals concerning the operations to be performed and transmit them to the management servers 110, 120. The management servers 110, 120 can then manage the execution of the operations by the devices 111, 112, 113, 121, 122 which are connected to them.

To determine the order of execution, the coordination server may advantageously take into account the dependencies that exist between the various devices. According to one embodiment, the coordination server is configured to receive information on these dependencies. In this case, the sending to the coordination server 130 of information about dependencies between the devices 111, 112, 113, 121, 122 can be carried out via one or more communication technologies. As examples and without limitation, it is possible to use one or more technologies among: wired communication, and wireless technologies such as Wifi, Bluetooth, Bluetooth LE, Infrared, NFC, Zigbee, Enocean, Z-Wave, Sigfox, LTE-M, or LoRaWAN.

"Dependency" between two devices is understood to mean that the operation of one of the devices is linked to the operation of the other device, or that the execution of an operation by/on one device has an effect on the other device. In particular, there may be a connectivity dependency between two devices, when one device offers connectivity to the other device, or when one device is connected to another device. The connectivity dependency may be physical (for example, as part of a wired connection such as an Ethernet cable or powerline communication) or logical (for example, as part of a wireless connection such as a Wifi or Bluetooth connection). For example, in the case of headphones communicating in Bluetooth with a multifunction mobile terminal ("smartphone"), there is a connectivity dependency between the headphones and the multifunction mobile terminal.

There may also exist a so-called "service" dependency (or "functional service dependency") between the devices, for example when one device is configured to trigger the execution of an operation by another device. For example, a voice assistant can be configured to control turning off the lights of a room if it has been detected, by a presence detector, that no one is present in that room (there is then a service dependency between the presence detector, the lights, and the voice assistant).

Figure 2:
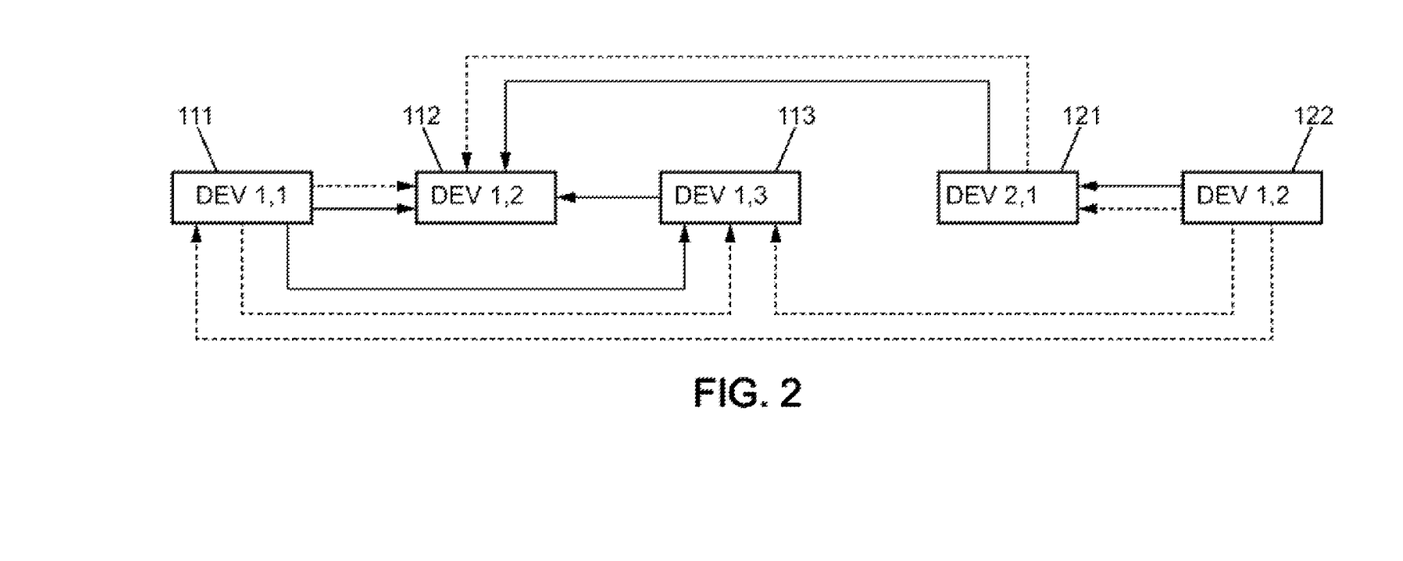
FIG. 2 represents an example of dependencies between several IT devices.

FIG. 2 represents an example of dependencies between several IT devices.

In FIG. 2, connectivity dependencies are represented by dotted arrows, while service dependencies are represented by solid arrows.

As an example, the devices 111, 112 and 113 of the first group of devices can correspond respectively to a multifunction mobile terminal, Bluetooth headphones, and a networked watch, and the devices 121 and 122 of the second group of devices can correspond to a television (IP television) and an access gateway or electronic control unit, or "box", providing fixed and/or mobile access to high-speed Internet.

In this example, the box 122 is configured to provide WiFi connectivity to the multifunction mobile terminal 111, to the networked watch 113, and to the television 121. The multifunction mobile terminal is configured to communicate in Bluetooth with the headphones 112 and with the watch 113. When the headphones 112 are connected to the multifunction mobile terminal 111, an application can be launched from the multifunction mobile terminal 111, the connected watch 113, or the television 121, in order to send audio content to the headphones 112. Furthermore, the television is configured to display video content based on a control signal emitted by the box 122.

This example illustrates the complexity of the dependencies that can exist between different devices managed by independent management servers, and the need to take these dependencies into account in order to guarantee the security and proper operation of these devices.

Figure 3:
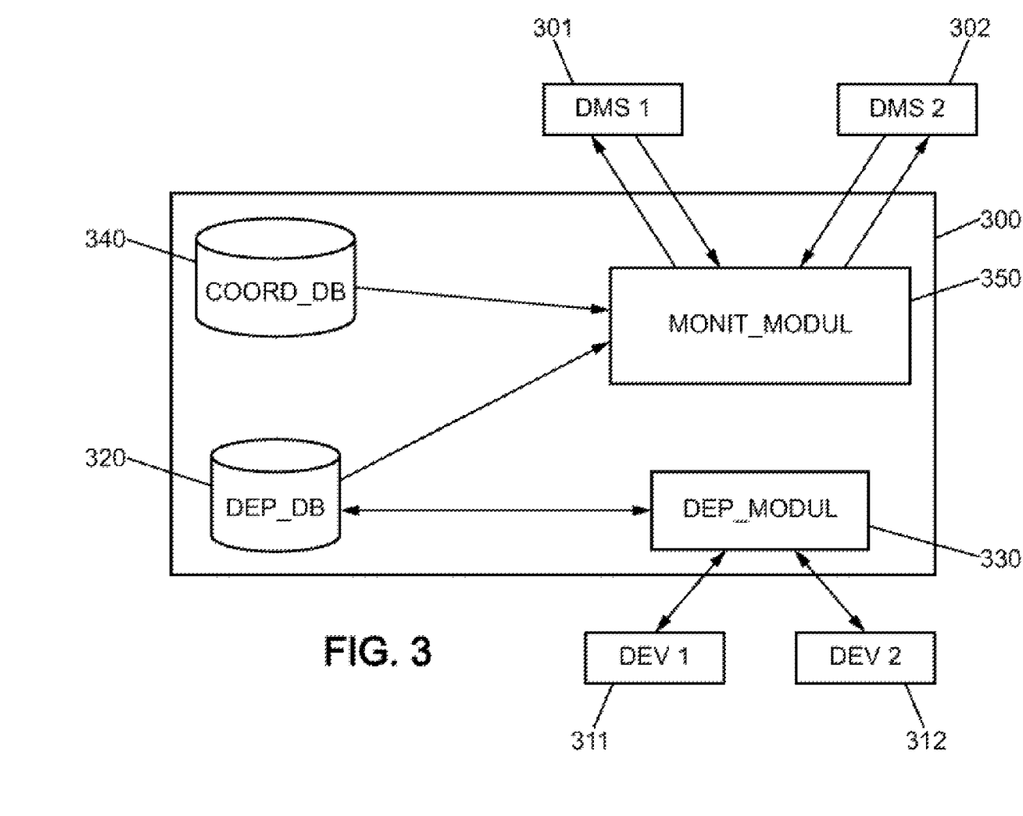
FIG. 3 represents a coordination server for a plurality of device management servers, according to one embodiment of the invention.

FIG. 3 represents a coordination server for a plurality of device management servers, according to one embodiment of the invention.

As shown in FIG. 3, a first management server 301 manages a first device 311, and a second management server 302, independent of the first management server 301, manages a second device 312.

The coordination server 300 ensures the coordination of the management servers 301 and 302, and in particular the coordination of the operations which must be carried out on the devices 311, 312 connected to the management servers 301, 302. In order to take into account the dependencies that can exist between the devices 311, 312 of the network, the coordination server comprises a dependency module 330.

The dependency module 330 is configured to manage the dependencies between the various devices 311, 312, in particular the connectivity dependencies and the service dependencies. The dependency module 330 may be linked to a dependency database 320. In one embodiment of the invention, the dependency database 320 may contain data making it possible to characterize all the dependencies, as well as the type of dependency, between the various devices 311, 312 of the network. For example, the dependency database 320 can be built based on an entity-relationship diagram (ERD), a data dictionary, a dependency graph, or any other tool used to characterize relations between entities.

Advantageously, the dependency module 330 is further configured to update the dependencies stored in the dependency database 320, by adding new dependencies, removing obsolete dependencies, or updating dependencies (the dependency type for example) between devices, according to the evolution of the system (addition/removal of devices in the system, changes to the interconnection between devices for exchanging information, etc.).

In one embodiment, the determination of dependencies is performed by the dependency module 330, and therefore within the coordination server 300. For example, this determination may be performed by analyzing the communications between the various devices 311, 312.

In an alternative embodiment, the determination/management of dependencies is performed by the devices 311, 312. According to this embodiment, the dependency database can be distributed in the devices (each device stores the information concerning the dependencies that it can have with other devices). The devices 311, 312 can provide the dependency module 330 with information concerning their dependencies with the other devices. For example, one device 311 can define a protocol for sending to the dependency module 330 the dependencies it can have with the other devices 312 of the system. The dependency information may be described in the data model of the protocol.

For example, for the connectivity dependency, the device 311 may be configured to analyze the communications on its various communication interfaces, in order to detect the connectivity dependency when another device 312 connects to/disconnects from one of these interfaces. For the service dependency, the information may be extracted from the firmware of the 311 device, in the case where the firmware includes a description of the possible services for the device 311, as well as the service dependencies with services performed by the other devices 312 of the system. This description may, for example, be written in a file encapsulated in the firmware. This information can be sent to the dependency module 330 of the coordination server 300, in particular after a firmware update, or after an activation or deactivation of the services concerned. For example, a new firmware update of a television may add the new feature "turn on a light by voice command". The firmware update includes information about the service dependency between the TV and light associated with this new feature (e.g. the different versions of the APIs of the light with which the feature is compatible, or the reference information of the lights for which the functionality is compatible). After updating the firmware and activating the service associated with this new feature, the dependency information associated with this new service can be sent from the device 311 to the dependency module 330.

In another embodiment, the dependency information may be transmitted to the dependency module 330 by the management servers 301, 302. To do so, the management servers 301, 302 must follow a protocol allowing such transmission of information. For example, the TR-069 protocol provides a bidirectional exchange of identity between a device and the gateway. The device communicates its identifier as well as the identifier of the gateway, to the auto-configuration server (ACS), and the gateway communicates to the auto-configuration server the devices which are connected to it. According to the TR-069 standard, the devices and the gateway can be managed by the same auto-configuration server, or by two separate and independent auto-configuration servers. Thus, such a protocol allows sending connectivity dependency information from the management server 301, 302 to the dependency module 330 of the coordination server 300.

For service dependencies, the dependency information may be provided by the management server following activation of a service in a device 311 referenced in another service of another device 312. The services embedded in the firmware must be described and known by the management server 301, 302. In other words, the management server 301, 302 must have the description of the possible services for the device 311, as well as the service dependencies with the services performed by the other devices 312 of the system (for example, compatibility of the APIs). The dependency information can be updated after receiving confirmation of a firmware update or an activation/deactivation of a service.

In another embodiment, the dependency information may be transmitted to the dependency module 330 by an external component. For example, an interactive service may allow users to describe dependencies between devices (in particular by using speech recognition software—a user can orally describe the dependency to the voice assistant, which can then translate these data into a dependency graph). According to another example, an external component may be configured to analyze the network, collect information on the devices, and determine the dependencies (and types of dependencies) between the devices. In this case, an authorization of the user may be requested beforehand for personal data protection reasons. According to another example, if the various devices are managed by the same operator, it is possible to explore the Information System database (in particular including customer contracts, device information sheets, etc.) in order to define dependencies between devices. To do so, it is possible to use Natural Language Processing algorithms (NLP). According to this example, authorization from both the user side and the Information System side may be requested beforehand for personal data protection reasons.

Of course, a combination of the preceding embodiments may be used for collecting dependency information within the dependency module 330. For example, part of the information may be sent from the devices 311, 312, another part of the information may be sent from the management servers 301, 302, etc.

Furthermore, the choice of components configured for sending dependency information to the dependency module 330 depends on the constraints on the device side 311, 312, on the management server side 301, 302, and on the user side. For example, the identification of dependencies within the devices 311, 312 offers the highest level of protection of a user's personal data. However, this identification requires a certain amount of resources, which a device may not necessarily have. At the management server 301, 302, it must have a protocol making it possible to retrieve dependency information and transmit it to the dependency module 330. If the protocol of the management server 301, 302 does not allow retrieving/transmitting the dependency information, and if the device 311, 312 does not have sufficient resources, an external component may be used if an authorization from the user side is obtained beforehand for personal data protection reasons.

The determination of dependency information may be implemented upon request (from a user, a service, etc.) in order to limit the consumption of bandwidth, or "continuously" so that the dependency database 320 is constantly up to date and thus can be used by other services where appropriate.

A first instruction, corresponding to the initiation of a first management operation concerning the first device 311, is sent by the first management server 301 in charge of the first device 311. A second instruction, corresponding to the initiation of a second management operation concerning the second device 312, is sent by the second management server 302 in charge of the second device 312. The management operations may be initiated in parallel or sequentially.

The instructions are received at the coordination server 300 via the monitoring module 350. The monitoring module 350 is configured to calculate and determine an order of execution of the management operations corresponding to the instructions received, based in particular on the dependencies between the devices 311, 312, stored in the dependency database 320.

The order of execution of the management operations can be determined by the monitoring module 350 according to different decision schemes, which may be predefined or chosen according to the configuration of the system (number of management operations to be performed, available bandwidth, etc.). In one embodiment, the monitoring module 350 may be configured to apply a "First In, First Out", type of method (FIFO). According to this method, the operations are executed in their order of arrival. If an instruction for a first device 311 is transmitted first to the monitoring module 350, the associated operation is executed first, and all other operations intended for the devices 312 which have a dependency with the first device 311 are locked until completion of the first operation. Then, the second operation corresponding to the instruction transmitted to the monitoring module 350 just after the first instruction is initiated in a similar manner.

Advantageously, the order of execution of the management operations corresponding to the instructions received is additionally determined from rules for coordinating the execution of the operations, and consequently from the associated instructions, defined based on "coordination policies" stored in a coordination knowledge base 340.

In one embodiment, the monitoring module 350 may comprise a buffer memory for storing a set of instructions as well as the management operations being executed, and determining the order of execution and the orchestration of this set of instructions. For example, the set of stored instructions may comprise all instructions that have arrived during a given time interval (for example, all instructions that have reached the monitoring module during 15 minutes), or a predetermined number of instructions (for example, 10 consecutively received instructions). Instruction collection windows are thus defined. At the end of a window, the monitoring module determines the order of execution of the operations corresponding to the instructions stored within the window, while a new window is initialized.

The coordination policies stored in the coordination knowledge base 340 may be determined as follows.

Each management server 301, 302 to be coordinated by the coordination server 300 sends data to describe the devices 311, 312 connected to it, the various possible operations on these devices 311, 312 which may temporarily have an effect on the other devices, as well as the effects that may be caused by the execution of these operations. These data may be sent to the monitoring module 350, to another module (different from the monitoring module 350 and from the dependency module 330) of the coordination server 300, or to a processing module external to the coordination server 300.

In a multiserver environment such as the one represented in FIG. 3, the management servers 301, 302 are generally independent and heterogeneous. Thus, these descriptive data can advantageously be constructed from a model defining a common vocabulary that allows describing the various operations and the effects associated with their execution.

For example, possible operations that can have a temporary effect on other devices may include:
  restarting the device;
  updating the firmware of the device;
  the configuration of the device (change of parameters, activation/deactivation of a service, etc.); and
  resetting the device (restoring the factory configuration).

The effects that can result from performing these operations may include:
  loss of connectivity; and
  functional incompatibility.

For example, a reset or configuration operation consisting of deactivating a service on a device can cause a functional incompatibility if another device uses this service. In another example, an operation of updating, restarting, or resetting a device can cause a loss of connectivity of this device, and of the devices connected to it.

From the descriptive data of the various possible operations and the effects that can be caused by executing these operations, it is possible to define coordination policies, which comprise a set of rules for coordinating the execution of the operations according to the various possible configurations.

For example, a coordination policy may comprise the following rules for coordinating the execution:
  if the coordination server 300 receives "restart", "update", or "reset" type operations for one or more devices(s) 311, 312; and
  if there are connectivity dependencies between the devices 311, 312 concerned;
  then the execution of these operations is done in the following order: first the operations on the "parent" devices (meaning those which provide the connectivity or initiate the connection), then the operations of the "child" devices.

The rules for executing the coordination may also be fixed or determined according to predetermined objectives. For example, it may be decided that all the operations aimed at improving the security of a device or of the system, such as correcting security vulnerabilities, have priority over the others.

Furthermore, it may be advantageous to take the service level agreements into account to determine the security policies (as coordination policies), particularly in the case where the various management servers are managed by different operators. "Service-Level Agreement" (SLA) is understood to mean an agreement signed between a service provider and a customer, defining the expected objectives and the service level that the customer wishes to obtain from the provider, as well as the responsibilities of each party. Based on the service level agreements, it is possible to determine different priority levels for the management servers (for example, if the management servers correspond to different operators and the client has chosen to prefer operator X over other operators, the operations associated with the management server of operator X can take priority over the other operations), for the operations (for example, if the agreement stipulates that operations on certain devices have priority over operations on other devices), etc.

The coordination policies may be more complex. They may in particular combine several of the preceding examples. They may also go beyond coordination of the operations received, in particular by generating new operations initially not developed in order to guarantee the operation of devices that depend on these services, such as checking the status of the services (activated/deactivated) after execution of the operations, or verifying compatibility of the APIs before the execution of device management operations. For example, if a service dependency is detected between two devices concerned by the operations received by the coordination server, that server can ask the management server to check whether the services of the "dependent" device are still active. If the services are inactive, the coordination server can identify the services and ask the management server to launch an activation operation for the services affected by this dependency. New operations are thus generated that were not initially planned.

According to another example, if a service dependency between two devices is detected in a multi-operator system of management servers, the coordination server may possibly block execution of the operations if an incompatibility of the APIs is detected or foreseeable. For example, if an operation to update an API of a device A is available, while other devices use this API but are not yet updated to support this new version, the coordination server blocks the updating of device A until the devices that depend on this device A are compatible. The rules concerning the APIs of the firmware and the compatibility with external APIs may be written by the monitoring module 350 in the coordination knowledge base.

The coordination policies may be defined by the monitoring module 350, by another module of the coordination server 300, or by a module external to the coordination server 300.

Referring again to FIG. 3, the monitoring module 350 can determine, based on the rules for coordination the execution that are associated with the coordination policies, the order of execution of the operations on the devices 311 and 312 and can transmit them to the management servers 301, 302. The monitoring module 350 can thus be configured to send to the first management server 301 a control signal to execute the first operation on the first device 311, and to send to the second management server 302 a control signal to execute the second operation on the second device 312.

In the example of FIG. 3, the monitoring module 350 is configured to determine the order of execution and to orchestrate the execution of the operations with the management servers 301, 302. Of course, these two functions may be performed by two separate modules of the coordination server 300.

According to one embodiment, the control signals are sent to the respective management servers 301, 302 according to the determined order of execution. For example, if the order of execution indicates that the operation on the first device 311 must be performed after the operation on the second device 312, then the following steps can be performed, in this order:

a control signal is sent to the second management server 302, to control the execution of the second operation; then a control signal is sent to the first management server 301, to control the execution of the first operation.

Of course, any other method enabling the execution of the operations in the determined order may be used. For example, it is possible to include timestamp information in the control signals, indicating when the operation is to be performed.

In the event that operations can be carried out in parallel, it is possible to assign the same order of execution to these operations.

In one embodiment, each management server 301, 302 may send, after receiving the control signal intended for it, an acknowledgment message to indicate that it has indeed received the control signal. In this embodiment, the monitoring module 350 may be configured to send the current control signal only after receiving the acknowledgment of the previously sent control signal.

Additionally or alternatively, each management server 301, 302 sends an acknowledgment of execution of the operation on the devices for which it is responsible. This acknowledgment of execution may for example:

indicate that the operation has completed. In this case, the message is sent after completion of the operation. This embodiment is advantageous when an operation must be completed so that another operation can be initiated (for example, a security update on a computer must be completed before synchronizing the data of a multifunction mobile terminal on this computer); or indicate that the operation is in progress. In this case, the message may just indicate that the operation has been initiated. This embodiment is advantageous when the operations can be carried out in parallel.

A coordination server as defined above may advantageously be used in many fields.

For example, in the field of the smart home and home automation, there are numerous service and connectivity dependencies. For example, in the case of managing a customer's local area network, a certain number of devices (such as the set-top box or STB) depend on the client's Internet access gateway for their local area network connectivity. A conflict may arise if, while a device is downloading new firmware, a request is made to restart or change the firmware of the access gateway, resulting in a loss of connectivity. The first update would then be corrupted. A coordination server as defined in the invention allows ensuring that a device management command will not be carried out on a connectivity-providing unit during an update to another device that is dependent on it.

Still in the field of the smart home, many new services are implementing voice assistants that interact with connected objects by connecting to their API. An update of a connected object that would modify the exposed API of the object can render the service inoperative, unless the resources describing the interface are updated in the voice assistant. An update of a connected object may therefore require configuring/updating another object. A coordination server as defined in the invention makes it possible to coordinate and identify the cross-impacts between objects and to take the necessary measures for continuity of service. Indeed, in the proposed solution, the coordination server can command the management server of the voice assistant to update the resources of the objects that may be impacted.

The same management issues are found in the fields of smart cities and smart industries. Indeed, these fields operate and use "Internet of Things gateways" types of devices, which offer cellular connectivity services similar to those of access gateways located in homes. Similarly, the management of service dependencies, and in particular the consistency of updates, between several devices at the same time is a problem which also arises in these fields.

In addition, the proposed solution allows multi-level coordination. On the one hand, the proposed solution allows inter-operator coordination, which can be particularly advantageous, particularly in the case of over-the-top services (OTT). In this case, each operator can have its own coordination server, and all of the coordination servers are coordinated at a higher level. In this case, agreements are necessary between the operators concerned. On the other hand, the proposed solution allows inter-manufacturer coordination. In fact, coordination between device management systems is conceivable. For example, there may be coordination between firmware updates on smart lights, and on voice assistants configured to control remotely turning these lights on/off. In this case, the two manufacturers have an interest in setting up a common coordination server external to their own systems.

FIG. 4 is a flowchart of the method for coordinating a plurality of device management servers, according to one embodiment of the invention.

In an optional step 401, descriptive data are transmitted from a management server to the coordination server. As described above, these data make it possible to describe the devices connected to the management server, the various possible operations on these devices, as well as the effects which may result after execution of these operations. Alternatively, the descriptive data may be transmitted to an external server.

In steps 402 and 403, the coordination server receives instructions corresponding to two operations on two devices managed by two separate management servers, as described above.

In step 404, the coordination server obtains information on dependencies between the two devices, as described above.

Still in step 404, the coordination server can obtain rules for coordinating the execution, defined for example by coordination policies as mentioned previously.

An order of execution for the operations is then determined (step 405) from the dependency information, as well as from the obtained rules for coordinating the execution.

As described above, control signals for controlling the execution of the operations according to the determined order of execution are then generated (step 406), and sent (step 407) to the corresponding servers.

Figure 5:
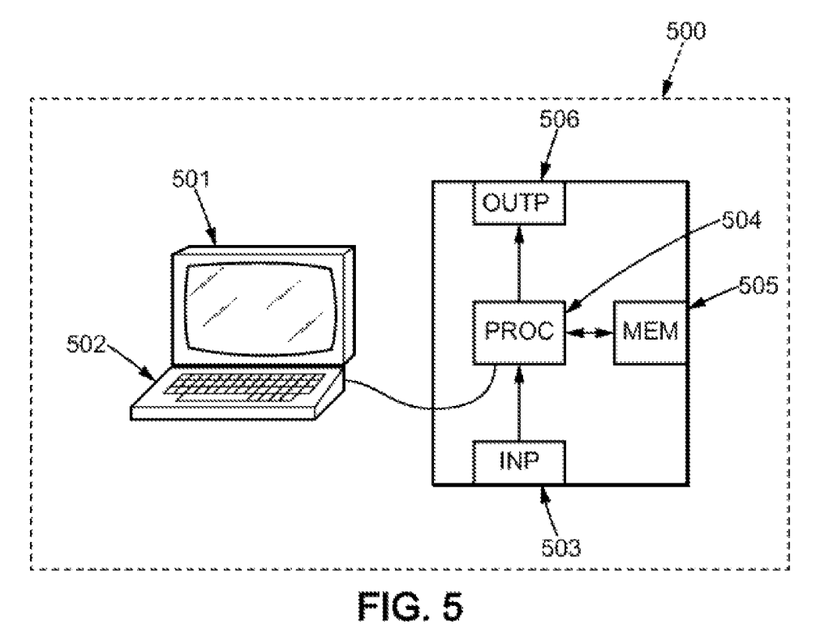
FIG. 5 illustrates an example of a unit for coordinating a plurality of device management servers, according to one embodiment of the invention.

FIG. 5 illustrates an example of a unit for coordinating a plurality of device management servers, according to one embodiment of the invention.

In this embodiment, the unit 500 comprises a memory 505 for storing instructions enabling the implementation of the method, data concerning the received operations to be executed, data concerning the dependencies between the devices, and temporary data for carrying out the various steps of the method as described above.

The unit further comprises a circuit 504. This circuit may be, for example:
- a processor capable of interpreting instructions in the form of a computer program, or
- a circuit board in which the steps of the method of the invention are described in silicon, or else
- a programmable electronic chip such as an FPGA chip ("Field-Programmable Gate Array"), a SOC ("System On Chip"), or an ASIC ("Application Specific Integrated Circuit").

SOCs or Systems on Chip are embedded systems that integrate all the components of an electronic system into a single chip.

An ASIC is a specialized electronic circuit that groups functionalities tailored to a given application. ASICs are typically configured during manufacture and can only be simulated by the user.

The programmable logic circuits of the FPGA (Field-Programmable Gate Array) type are electronic circuits that can be reconfigured by the user.

This unit has an input interface 503 for receiving instruction data, dependency information, and acknowledgments of receipt/execution, and an output interface 506 for providing control signals for the execution of the operations according to the determined order. Finally, to allow easy interaction with a user, the computer may comprise a screen 501 and a keyboard 502. Of course, the keyboard is optional, particularly in the context of a computer in the form of a touch-screen tablet for example.

In one particular embodiment, the input interface 503 is arranged to receive coordination policies.

Depending on the embodiment, the unit 500 may be a computer, a computer network, an electronic component, or some other device comprising a processor operably coupled to a memory, as well as, depending on the embodiment chosen, a data storage unit, and other associated hardware elements such as a network interface and a media drive for reading a removable storage medium and writing to such a medium (not shown in the figure). The removable storage medium may be, for example, a compact disc (CD), a digital video/versatile disc (DVD), a flash drive, a USB stick, etc.

Depending on the embodiment, the memory, data storage unit, or removable storage medium contains instructions which, when executed by the control circuit 504, cause the control circuit 504 to implement or control the input interface 503, output interface 506, data storage in memory 505, and/or data processing portions of the examples of implementing the proposed method described herein.

The control circuit 504 may be a component implementing the control of units 503, 505 and 506 of the unit 500.

In addition, the unit 500 may be implemented as software, in which case it takes the form of a program executable by a processor, or as hardware, such as an application specific integrated circuit (ASIC) or a system-on-chip (SOC), or as a combination of hardware and software elements, for example such as a software program intended to be loaded and executed on an electronic component described above (e.g. FPGA, processor).

The unit 500 may also use hybrid architectures, for example such as architectures based on a CPU+FPGA, a GPU (Graphics Processing Unit), or an MPPA (Multi-Purpose Processor Array).

Furthermore, the functional diagram shown in FIG. 4 is a typical example of a program of which certain instructions can be carried out on the server described. As such, FIG. 4 can correspond to the flowchart of the general algorithm of a computer program within the meaning of the invention.

Of course, the present invention is not limited to the embodiments described above by way of examples; it extends to other variants.

Other embodiments are possible.

For example, there may be several coordination servers, each associated with a group of management servers belonging to the same operator. In other words, there may be one coordination server per operator. In this case, to coordinate the inter-operator device management operations as a function of the dependencies between the devices, a hierarchical coordinator that coordinates the coordination servers of each operator is necessary. In addition, in this case, the operators must share the same metamodel for the dependency databases and the coordination knowledge bases respectively, in order to guarantee interoperability between the coordination servers.

Depending on the embodiment chosen, certain acts, actions, events, or functions of each of the methods described in this document may be performed or occur in a different order than that in which they were described, or may be added, merged, or not be carried out or not occur, as the case may be. Furthermore, in some embodiments, certain acts, actions, or events are performed or occur concurrently and not sequentially.

Although described through a number of detailed exemplary embodiments, the proposed method and the devices for implementing the method include various variants, modifications, and improvements which will be evident to those skilled in the art, it being understood that these various variants, modifications, and improvements are within the scope of the invention as defined by the claims which follow. In addition, various aspects and features described above may be implemented together or separately, or may be substituted for each other, and all of the various combinations and sub-combinations of the aspects and features are within the scope of the invention. In addition, some systems and devices described above may not incorporate all of the modules and functions described for the preferred embodiments.

The invention claimed is:

1. A method implemented by a coordination computer server, for coordinating a plurality of device management servers in a computer network, said plurality of device management servers comprising at least a first management server and a second management server, the method comprising:
   receiving a first instruction intended for a first device connected to said first management server;
   receiving a second instruction intended for a second device connected to said second management server, wherein the first and second devices are different devices;
   obtaining dependency information concerning existence of a dependency in operation or execution of an operation between the first device and the second device;
   obtaining rules for coordinating execution of the first instruction and the second instruction, said rules for coordinating said execution being based on coordination policies and said dependency information;
   determining an order of execution of the first instruction and second instruction, based on the dependency information and the coordination rules obtained; and
   generating and sending a first control signal for executing the first instruction and a second control signal for executing the second instruction according to the determined order.

2. The method according to claim 1, wherein said dependency information comprises at least one of:
   information about connectivity dependency between the first device and the second device; or
   information about service dependency between the first device and the second device.

3. The method according to claim 1, further comprising:
   for each current management server among the first management server and the second management server, receiving descriptive data corresponding to said current management server, said descriptive data comprising:
      a definition of a plurality of devices connected to said current management server,
      information about dependency between devices of said plurality of devices connected to said current management server,
      a definition of operations associated with said plurality of devices connected to said current management server, and
      a definition of effects associated with said operations on at least one device among said plurality of devices connected to said current management server;
   determining said rules for coordinating the execution, from said descriptive data received for the first management server and the second management server.

4. The method according to claim 3, wherein said rules for coordinating the execution are further determined from predetermined quality of service criteria.

5. The method according to claim 1, further comprising:
   for each control signal among said first control signal and said second control signal, receiving an acknowledgment of receipt of said control signal.

6. The method according to claim 1, further comprising:
   for each control signal among said first control signal and said second control signal, receiving an acknowledgment of execution of the respective instruction associated with said control signal.

7. The method according to claim 6, wherein the order of execution defines an instruction to be executed first among the first instruction and the second instruction, the method further comprising:
   receiving the acknowledgment of execution of the instruction to be executed first in response to the sending of the associated control signal;
   wherein the control signal associated with the instruction to be executed second is sent only after receipt of said acknowledgment of execution.

8. A coordination server for coordinating a plurality of device management servers in a computer network, said plurality of device management servers comprising at least a first management server and a second management server, the coordination server comprising:
   a processor; and
   a non-transitory computer-readable medium comprising instructions stored thereon which when executed by the processor configure the coordination server to:
   receive a first instruction intended for a first device connected to said first management server;
   receive a second instruction intended for a second device connected to said second management server, wherein the first and second devices are different devices;
   obtain dependency information concerning existence of a dependency in operation or execution of an operation between the first device and the second device;
   obtain rules for coordinating execution of the first instruction and the second instruction, said rules for coordinating said execution being based on coordination policies and said dependency information;

determine an order of execution of the first instruction and the second instruction, based on the dependency information and the coordination rules obtained; and generate and send a first control signal for executing the first instruction and a second control signal for executing the second instruction according to the determined order.

9. A system comprising:

a plurality of device management servers in a computer network, said plurality of device management servers comprising at least a first management server and a second management server;

a plurality of devices connected to said plurality of device management servers, said plurality of devices comprising at least a first device connected to said first management server and a second device connected to said second management server, wherein the first and second devices are different devices;

at least one memory storing:
- a dependency database comprising dependency information concerning a dependency between devices among said plurality of devices; and
- a coordination knowledge base comprising a plurality of rules for coordinating instructions on devices among said plurality of devices;

a coordination server comprising:
- a processor; and
- a non-transitory computer-readable medium comprising instructions stored thereon which when executed by the processor configure the coordination server to:
- receive a first instruction intended for said first device;
- receive a second instruction intended for said second device;
- obtain, from the dependency database, information about existence of a dependency in operation or execution of an operation between the first device and the second device;
- obtain, from the coordination knowledge base, rules for coordinating execution of the first instruction and the second instruction, said rules for coordinating said execution being based on coordination policies and said dependency information;
- determine an order of execution of the first instruction and the second instruction, based on said dependency information obtained and said coordination rules obtained; and
- generate and send a first control signal for executing the first instruction and a second control signal for executing the second instruction according to the determined order.

10. A non-transitory computer-readable medium storing instructions which, when said instructions are executed by a processor of a coordinating server configure the coordinating server to:

coordinate a plurality of device management servers in a computer network, said plurality of device management servers comprising at least a first management server and a second management server, the coordinating comprising:
- receiving a first instruction intended for a first device connected to said first management server;
- receiving a second instruction intended for a second device connected to said second management server, wherein the first and second devices are different devices;
- obtaining dependency information concerning existence of a dependency in operation or execution of an operation between the first device and the second device;
- obtaining rules for coordinating execution of the first instruction and the second instruction, said rules for coordinating said execution being based on coordination policies and said dependency information;
- determining an order of execution of the first instruction and the second instruction, based on the dependency information and the coordination rules obtained; and
- generating and sending a first control signal for executing the first instruction and a second control signal for executing the second instruction according to the determined order.

* * * * *